United States Patent Office 3,166,536
Patented Jan. 19, 1965

3,166,536
BORON-CONTAINING POLYMERIZATION
CATALYSTS
Donald R. Witt, Bartlesville, Okla., assignor to Phillips
Petroleum Company, a corporation of Delaware
No Drawing. Filed Feb. 19, 1960, Ser. No. 9,694
19 Claims. (Cl. 260—88.2)

This invention relates broadly to an improved process for the polymerization of polymerizable hydrocarbons, especially olefins. In accordance with one aspect, this invention relates to a novel and improved polymerization catalyst and a method of manufacturing the catalyst. In accordance with another aspect, this invention relates to a novel and improved polymerization process for the polymerization of olefins employing a novel polymerization catalyst for the production of normally solid polymers.

The polymerization of polymerizable hydrocarbon monomers, such as olefins and diolefins, by means of various catalyst systems is well known in the art. One such catalyst system comprises a transition metal halide and at least one of certain reducing agents. Such a catalyst system suffers from the disadvantages of being difficult to handle and the polymer contains halogen from the transition metal halide. In my copending application, Serial No. 777,226, filed December 1, 1958, I show that transition metal borohydrides and their analogues in which one or more of the hydrogen atoms is replaced by a hydrocarbon radical were highly effective for the polymerization of olefins, such as ethylene. In accordance with the present invention, I have now discovered that catalysts of enhanced utility can be prepared by reacting a transition metal borohydride, such as disclosed in my copending application, with an inorganic solid material of the silica, alumina or silica-alumina type.

Accordingly, it is an object of this invention to provide a new and improved polymerization catalyst.

It is another object of this invention to provide a novel method for preparing such catalysts which are particularly active in polymerizing 1-olefins.

Still another object of this invention is to provide an improved process for the polymerization of alicyclic and acyclic unsaturated hydrocarbons.

Still another object of this invention is to provide an improved process for polymerization of 1-olefins to normally solid polymers.

Other aspects, objects, as well as the several advantages of this invention, are apparent to those skilled in the art from a study of this disclosure and the appended claims.

In accordance with the present invention, high molecular weight, normally solid polymers are obtained by polymerizing polymerizable olefinic compounds in the presence of a catalyst comprising a reaction product of a transition metal borohydride or hydrocarbon or halogen derivatives thereof and an oxide selected from the group consisting of silica, alumina and silica-alumina. These catalysts are highly effective for the polymerization of olefins and other monomers.

The novel catalysts of this invention are formed by reaction of an inorganic solid material of the silica, alumina, or silica-alumina type and a transition metal borohydride or analogues of these borohydrides in which one or more of the hydrogen atoms of the borohydride radicals is replaced by a hydrocarbon radical or a borohydride radical is replaced with a halogen. The transition metal borohydrides can be represented by the structural formula $M(BR_4)_aX_b$ wherein M is a transition metal, each R is H or a hydrocarbon radical, for example all R's need not represent the same radical, X is a halogen selected from the group of chlorine, bromine and iodine, and the sum of $a$ plus $b$ is equal to the valence of the metal atom M.

The hydrocarbon radicals referred to in the above formula can be saturated acyclic, saturated alicyclic, aromatic, and combinations thereof such as alkyl, cycloalkyl, aryl, alkaryl, aralkyl, alkylcycloalkyl, cycloalkylalkyl, arylcycloalkyl, cycloalkylaryl, and the like. Preferably, all of the hydrocarbon radicals will be alkyl radicals, and more preferably will not contain more than 6 carbon atoms per radical. As is well known in the art, certain transition metals can exhibit a valence of 4 or more, for example, in $WCl_6$ and $MoCl_5$, the tungsten has a valence of six and the molybdenum has a valence of five.

Examples of metal borohydrides useful in this invention are listed below.

| Compound: | Hydrocarbon radical |
|---|---|
| $Ti(BH_4)[B(CH_3)_4]_2$ | Methyl. |
| $Zr(BH_4)_3[B(C_2H_5)_4]$ | Ethyl. |
| $Zr(BH_4)_3[B(C_6H_5)_4]$ | Phenyl. |
| $Zr(BH_4)_3[B(C_6H_4CH_3)_4]$ | Methylphenyl. |
| $Zr[B(CH_3)_4]_4$ | Methyl. |
| $Th[B(CH_3)_4]_4$ | Methyl. |
| $Cd[B(C_2H_5)_4]_2$ | Ethyl. |
| $Cd[B(C_6H_5CH_2)_4]_2$ | Phenylmethyl. |
| $Cr[B(i-C_4H_9)_2(C_6H_5)_2]_3$ | Iso-butyl and phenyl. |
| $Ti[B(C_3H_7)_2H_2]_3$ | n-Propyl. |
| $Ti[B(C_6H_{11})_2H_2]_3$ | Cyclohexyl. |
| $Ti(BH_4)_2Cl$ | |
| $Ti(BH_4)Cl_2$ | |
| $Hf[B(C_6H_5)_4]_2Cl_2$ | Phenyl. |
| $V[B(C_6H_5)_4]_2Cl_2$ | Phenyl. |

The term "transition metals" means the elements of the B sub-groups of Groups I through VII of the periodic table (Deming), including the metals of the rare earth and actinide families, and all the metals of Group VIII. The preferred transition metals are those of sub-groups IVB, VB, and VIB. Examples of such metals include copper, cadmium, scandium, titanium, vanadium, chromium, manganese, nickel, cerium, thorium, hafnium, zirconium, etc.

Examples of suitable transition metal borohydrides that can be associated with the silica and/or alumina support of the present invention include $CuBH_4$, $AgBH_4$, $Ti(BH_4)_3$, $Zr(BH_4)_4$, $V(BH_4)_4$, $Zn(BH_4)_2$, $Cd(BH_4)_2$, $Ba(BH_4)_2$, $Hf(BH_4)_4$, $Fe(BH_4)_2$, $U(BH_4)_4$, $U(BH_4)_3$, $Np(BH_4)_4$, $Pu(BH_4)_3$, $V(BH_4)_3$, and $Th(BH_4)_4$.

In accordance with the present invention, at least one of the above described transition metal borohydride compounds is reacted with an inorganic solid. The solids employed are preferably the high surface area silicas, aluminas, and silica-aluminas, which are well known and can be readily synthesized or obtained commercially. For example, silica gel can be readily obtained by precipitation from water glass solutions by addition of an acid, such as phosphoric acid. Alumina, on the other hand, can be precipitated from solutions of an aluminum salt. The more preferred solids for use in the present invention are the silica-alumina composites. These inorganic solids are not highly effective catalysts for polymerization of olefins according to the process herein disclosed.

In the practice of this invention, the solid is first activated by heating to a temperature of at least above 570° F. so as to remove free water. Generally, it is preferred not to heat the solid to temperatures above about 1900° F. I have found that heating the solid to too high a temperature leads to a reduced ability of the activated solid to react with the transition metal complex, thereby resulting in a catalyst having reduced activity for polymerization. Activation of the solid can be carried out in any desired manner; however, I prefer to heat the solid with air at elevated temperature or in an atmosphere of any other suitable gas such as hydrogen, helium, nitrogen, etc.

The length of time the inorganic solid will be held at the activation temperature will depend upon the temperature employed, but in general the solid is heated for at least 5 minutes. In any event, the solid should be heated at a sufficiently elevated temperature and for a period long enough to remove substantially all of the free water present in the solid. As indicated above, the temperature and time of activation can vary over wide ranges and are closely interrelated (so-called "time-temperature effect"), longer times being required at lower temperatures and shorter at higher temperatures. The preferred activation is conducted at a temperature ranging from about 800° to about 1500° F. The time of activation can vary from about 5 minutes to about 250 hours and longer.

As indicated above, the inorganic solids employed are generally the high surface area silicas, aluminas, and silica-aluminas. The preferred solid is a silica-alumina composite containing from 40 to about 98 weight percent silica, more preferably about 60 to about 95 weight percent silica. However, it should be realized that the amount of silica present in the silica-alumina can range from a trace to as high as 98 weight percent or more as shown by the working examples hereinafter.

The transition metal borohydrides or analogues thereof of this invention can be prepared by any method desired and known to the art. One convenient method of preparing these boron-containing materials is by reacting a transition metal compound, preferably a halide, and more preferably chloride or bromide, with a borohydride of an alkali metal or alkaline earth metal or with a substituted borohydride of such metals where the borohydride contains one or more hydrocarbon radicals attached to the boron atom. The transition metal borohydrides can also be prepared by reacting a transition metal halide, hydride or "fluo salt" (for example, $NaTiF_5$) with $Al(BH_4)_3$. The method of purification of the transition metal borohydride or substituted borohydride will depend on the specific transition metal used. In some cases, solvent extraction or fractional crystallization can be used. In other cases, the product can be purified by vacuum distillation.

Another method of preparing the boron-containing compounds of this invention comprises reacting a compound of the type $M(OR)_n$ and diborane wherein R is a hydrocarbon radical, generally an alkyl. For example, if $Ti(OR)_4$ is reacted with diborane one obtains $Ti(BH_4)_3$. This method is described in the Journal of Electrochemical Soc., vol. 104, No. 1, 26 (1957).

Some of the boron-containing compounds are liquids and some are solids which can be melted by heating at a relatively low temperature, for example, in the range of about 75 to about 300° F. The activated silica and/or alumina solid can be dispersed in the liquid boron-containing compounds. Also, if desired, solutions of the boron-containing compounds can also be employed to contact the activated solid.

Solvents that can be employed for the boron-containing compounds include the hydrocarbons, particularly the alkanes and cycloalkanes, such as hexane, octane, cyclohexane, methylcyclohexane, and the like. Other particularly suitable solvents that can be employed are the ethers, such as methyl ether, ethyl ether, tetrahydrofuran, dimethyl ether of ethylene glycol, dimethyl ether or diethylene glycol and the like.

In still another method of reacting the inorganic solid with the boron-containing compound, the liquid or solid boron compound is vaporized and contacted with the activated solid. The vapor phase reaction is especially suitable for use with $Ti(BH)_3$ and other boron compounds which sublime at ambient or relatively low temperatures.

The reaction between the boron-containing compound and the activated inorganic solid can be effected over a wide temperature range. For example, temperatures ranging from minute 100° to about 600° F. can be employed and are suitable. Generally, the reaction is rapid so that reaction periods ranging from a few seconds to 1, or more, hours will suffice. At the end of the reaction or contacting period, the unreacted boron-containing compound, if present, can be removed by washing with a readily volatile solvent, by distillation, etc. The resulting catalyst can be freed of solvent and stored for use.

The final catalyst of the invention will generally contain from about 0.1 to about 10 weight percent of the transition metal. However, catalysts having greater amounts of the transition metal can be employed.

The catalysts of this invention are effective catalysts for the polymerization of polymerizable hydrocarbons. Preferably, the polymerizable hydrocarbons are olefins containing a $CH_2\!=\!C\!<$ radical. The preferred class of polymerizable hydrocarbons used is aliphatic 1-olefins having up to and including 8 carbon atoms per molecule. Specifically, the normal mono-1-olefins are preferred. Examples of the preferred olefins include ethylene, propylene, 1-butene, 1-hexene, and 1-octene. Branched chain olefins can also be used, such as isobutylene, as well as 1,1-dialkyl-substituted 1-olefins. Examples of the di- and polyolefines in which the double bonds are in nonconjugated position and which can be used in accordance with this invention are 1,5-hexadiene, 1,4-pentadiene, and 1,4,7-octatriene. Mixtures of the foregoing polymerizable hydrocarbons can be polymerized to a solid polymer in the presence of the described catalyst, for example, by copolymerizing ethylene and propylene, ethylene and 1-butene, propylene and 1-butene, or propylene and a pentene.

Also, aryl olefins, e.g. styrene and alkyl-substituted styrenes can be polymerized to a solid polymer in the process of this invention. This invention is also applicable to the polymerization of a monomeric material comprising conjugated dienes containing from 4 to 8 or more carbon atoms. Examples of conjugated dienes which can be used include 1,3-butadiene, isoprene, 2,3-dimethylbutadiene, 2-methoxybutadiene, 2-phenylbutadiene, and the like. It is also within the scope of the invention to polymerize such conjugated dienes either alone or in admixture with each other and/or with one or more other compounds containing an active $CH_2\!=\!C\!<$ group which are copolymerizable therewith. Examples of such compounds are listed hereinabove. Examples of other compounds containing an active $CH_2\!=\!C\!<$ group includes acrylonitrile, methyl acrylate, methyl methacrylate, vinyl chloride, 2-methyl-5-vinylpyridine, 2-vinylpyridine, and the like.

Acetylenic compounds are also polymerized in accordance with this invention. The acetylenic compounds include acetylene itself and various alkyl and aryl substituted acetylenes, containing generally not more than ten carbon atoms per molecule. A preferred group of acetylenic compounds is one having the triple bond between an end carbon atom and a carbon atom adjacent thereto; and a particularly preferred group are acetylenic compounds having not more than four carbon atoms. Examples of acetylenic compounds within the scope of this invention are methylacetylene, dimethylacetylene, ethylacetylene, propylacetylene, methylethylacetylene, phenylacetylene, tolylacetylene, vinylacetylene, diacetylene, the hexadiynes (e.g., dipropargyl), heptyne-1, butylacetylenes such as tert-butylacetylene, and the like.

The above enumeration of polymerizations promoted by the catalyst of this invention is not intended to be exhaustive but rather illustrates the wide variety of monomers which are polymerized or copolymerized by the method of this invention.

The polymerization according to this invention is best carried out in liquid phase, preferably in the presence of an inert diluent and particularly hydrocarbon such as cyclohexane and isooctane. The process can be batchwise or it can be continuous. Frequently, the catalyst is dispersed in the diluent, in which case it is often convenient to first disperse the catalyst in the diluent and pass the resulting suspension to the reaction zone where the monomer can be separately introduced or it can be pre-dissolved in a separate portion of diluent. The polymerization can be carried out at a temperature ranging from 0° F. or lower up to 450° F. A temperature in the range 150 to 300° F. is generally employed and a temperature in the range 225 to 300° F. is preferred. The pressure is not critical so long as it is sufficient to maintain liquid-phase conditions. With monomers which would normally be gaseous at reaction temperature, a monomer partial pressure of 100 to 500 p.s.i. is preferred since an increase in monomer partial pressure increases the reaction rate. While liquid phase processes are preferred, vapor phase polymerization processes are contemplated.

My invention will be further described with reference to the following examples. These examples show the operability of the invention and advantages thereof and should not be considered limiting in any manner except as taught by the complete specification.

The following examples illustrate the synthesis of these new catalyst compositions, and their use as polymerization catalysts.

EXAMPLE I

*Catalyst A.*—A commercial silica-alumina inorganic solid having a silica to alumina ratio of about 88/12 was heated in a stream of dry hydrogen for 5 hours at a temperature of 1050° F. A portion of the silica-alumina weighing 2.16 grams was placed in a tube which was evacuated and cooled to the Dry Ice temperature. $Ti(BH_4)_3$ was charged to a second tube which in turn was connected via a stopcock to the tube containing the inorganic solid. The stopcocks connecting the tube containing the solid and the borohydride were opened and the $Ti(BH_4)_3$ sublimed onto the solid.

Reaction was evident because the solid turned a light blue color. After about 30 minutes, the solid material turned black. The catalyst was pyrophoric in air. Upon heating the catalyst in boiling cyclohexane, no coloration of the cyclohexane developed. Since $Ti(BH_4)_3$ gives a blue colored solution in hydrocarbon, these observations indicate that the boron in the catalyst is not simply occluded $Ti(BH_4)_3$ which would be readily removed by washing. Further, when the catalyst was evacuated (pressure less than 1 mm. of mercury) no material was removed which could be trapped at liquid nitrogen temperatures. The catalyst was calculated to contain 11.3 weight percent of titanium based on the total weight of reactants.

EXAMPLE II

*Catalyst B.*—The commercial silica-alumina described in the preparation of catalyst A was activated by heating alternately in nitrogen and hydrogen atmosphere at 950 to 1000° F. The total activation period was 32 hours. The activated silica-alumina (14.98 grams) was added to a colorless solution containing approximately 1 gram of $Zr(BH_4)_4$ in dry cyclohexane. The solution was contained in a 200 ml. flask in a nitrogen atmosphere. The solution was initially at ambient temperature (70 to 80° F.) and became warm upon mixing with the activated solid. There was no significant color change. After approximately 15 minutes, the cyclohexane was distilled at a pressure below about 10 mm. of mercury and collected in a trap at Dry Ice temperature. The white catalyst was evacuated for one hour at ambient temperature; however, no $Zr(BH_4)_4$ was removed by this treatment. The catalyst thus prepared was calculated to contain 3.9 weight percent of zirconium based on the total weight of reactants.

EXAMPLE III

*Catalyst C.*—The commercial silica-alumina, as described above, was activated by heating in dry hydrogen for 5 hours at 1050° F. This activated solid was reacted with $Ti(BH_4)_2Cl$ which was prepared by reaction of 3.19 grams $LiBH_4$ with 2.5 ml. $TiCl_4$ according to the method described by Hoekstra and Katz, Jour. Amer. Chemical Soc., 71, 2489–90 (1949). The $ClTi(BH_4)_2$ which was recovered was sublimed onto the activated solid which was maintained at the Dry Ice temperature. The catalyst thus formed was a blue-violet color and was found to contain 2.0 weight percent chlorine and 2.6 weight percent titanium. This corresponds to a chlorine to titanium mol ratio of 1.03 and agrees closely with the theoretical mol ratio for the $ClTi(BH_4)_2$ used to impregnate the catalyst.

EXAMPLE IV

*Catalyst D.*—0.58 gram of $Zr(BH_4)_4$ dissolved in 40 milliliters of dry cyclohexane was added to a round bottom flask. 11.71 grams of a commercial silica-alumina solid having a silica to alumina weight ratio of about 75/25 was added to the solution of $Zr(BH_4)_4$ and cyclohexane. The silica-alumina solid had been activated with air at a temperature of 1100° F. for about 5 hours. The white catalyst thus formed contains about 2.8 weight percent zirconium based on the total weight of reactants.

EXAMPLE V

*Catalyst E.*—A commercial alumina solid was heated in a stream of air for 5 hours at 1100° F. 15.27 grams of the activated alumina was added to a flask containing a solution of $Zr(BH_4)_4$ in cyclohexane. The solution contained approximately 50 ml. of cyclohexane and 0.84 gram $Zr(BH_4)_4$. There was considerable bubbling as the alumina was added to the solution. This mixture was allowed to stand for about 1 hour before the cyclohexane was removed by distillation. The cyclohexane and other volatiles were collected and contacted with water. A white precipitate formed immediately and indicated that the $Zr(BH_4)_4$ had not reacted completely with the alumina. Boiling the solution down to dryness gave 0.22 gram of white solid. The treated alumina was quite reactive with water which indicated that the $Zr(BH_4)_4$ had reacted with the alumina. Correcting for the recovered transition metal, the calculated value for the zirconium content of this catalyst is about 2.1 weight percent based on the total weight of reactants.

EXAMPLE VI

*Catalyst F.*—A commercial alumina was activated by heating with a stream of air at a temperature of 1100° F. The above alumina has an alumina to silica weight ratio of about 93.2/6.8. 7.4 grams of the activated alumina was added to a round bottom flask containing a solution having 0.43 gram of $Zr(BH_4)_4$ and about 20 milliliters of dry cyclohexane. This mixture was allowed to stand, with agitation for about 20 minutes before the cyclohexane was removed by vacuum flashing. Vacuum was applied to the catalyst for an additional hour. The catalyst thus formed is calculated to contain about 3.3 weight percent zirconium based on the total weight of reactants.

EXAMPLE VII

*Catalyst G.*—A commercial silica-alumina solid having a silica to alumina weight ratio of about 88/12 was heated in a stream of air for 5 hours at a temperature of 1100° F. 11.18 grams of the activated silica-alumina was added to a round bottom flask containing 0.95 gram of $Hf(BH_4)_4$ and approximately 35 milliliters dry cyclohexane. This mixture was allowed to stand for 20 minutes with occasional mixing. The cyclohexane was then removed by vacuum flashing while maintaining room temperature in the flask. The catalyst was then pumped under vacuum for an additional hour before admitting dry nitrogen to the catalyst. The calculated value for the hafnium content of this catalyst is 5.9 weight percent based on the total weight of reactants.

EXAMPLE VIII

*Catalyst H.*—A commercial silica-alumina solid having a silica to alumina weight ratio of about 88/12 was heated in a stream of air for 5 hours at a temperature of 1100° F. 23.43 grams of the activated silica-alumina was added to a solution containing 2.51 grams $Zr(BH_4)_4$ dissolved in 50 milliliters of dry cyclohexane. This mixture was allowed to stand for some time with occasional agitation before the cyclohexane was removed by vacuum flashing. The catalyst thus formed was analyzed and found to contain 5.49 weight percent zirconium based on total weight of reactants.

the catalysts of this invention is characterized by a high density (about 0.95 g./cc.), and a high molecular weight. The polypropylene produced can be fractionated to yield isotactic polymers which are insoluble in n-heptane at the boiling point of n-heptane. The n-heptane insoluble fraction of a polypropylene is valuable as a molding resin and the n-heptane soluble fraction is valuable as a thickener for lube oils and other uses. The n-heptane soluble fraction can, if desired, be further fractionated.

The results of the polymerization runs made with the catalysts of the invention and transition metal borohydride catalysts (controls), disclosed in my copending application, supra, are summarized in Table I.

*Table I*

| Catalyst Designation | Control | Control | Control | Control | Control | Control | Cat. A | Cat. B | Cat. C |
|---|---|---|---|---|---|---|---|---|---|
| Borohydride | $Ti(BH_4)_3$ | $Zr(BH_4)_4$ | $Hf(BH_4)_4$ | $Ti(BH_4)_3$ | $Zr(BH_4)_4$ | $Hf(BH_4)_4$ | $Ti(BH_4)_3$ | $Zr(BH_4)_4$ | $ClTi(BH_4)_2$ |
| Inorganic Solid [1] | | | | | | | Si-Al | Si-Al | Si-Al |
| Olefin | Ethylene | Ethylene | Ethylene | Propylene | Propylene | Propylene | Ethylene | Ethylene | Ethylene |
| Run time, hours | 2.5 | 3 | 5 | 23.5 | 24 | 24 | 3 | 3 | 3 |
| Reaction temp., F | 255 | 280 | 275 | 255 | 270 | 240 | 280 | 275 | 280 |
| Reaction pressure, p.s.i.g | 300 | 300 | 300 | 480–385 | 570–545 | 435–465 | 300 | 300 | 300 |
| Catalyst, grams | 0.072 | 0.957 | 1.98 | 0.09 | 1.03 | 1.66 | 0.49 | 0.68 | 0.96 |
| Transition metal, millimoles | 0.778 | 6.354 | 8.323 | 0.973 | 6.839 | 6.969 | 1.134 | 0.283 | 0.531 |
| Polymer produced, grams | 39.2 | 133.9 | 37.8 | 1.49 | 0.3 | 0.5 | 83.7 | 86.3 | 84.4 |
| Yield, g./mole transition metal | 50,256 | 21,086 | 4,538 | | | | 73,000 | 305,000 | 159,000 |
| Viscosity (inherent) | 4.15 | 2.81 | | | | | 11.59 | 8.88 | |
| Density, g./cc | | | | | | | 0.9393 | 0.9422 | 0.9469 |

| Catalyst Designation | Cat. E | Cat. G | Cat. C | Cat. E | Cat. F | Cat. G | Cat. D | Cat. H | Cat. J |
|---|---|---|---|---|---|---|---|---|---|
| Borohydride | $Zr(BH_4)_4$ | $Hf(BH_4)_4$ | $ClTi(BH_4)_2$ | $Zr(BH_4)_4$ | $Zr(BH_4)_4$ | $Zr(BH_4)_4$ | $Zr(BH_4)_4$ | $Zr(BH_4)_4$ | $Zr(BH_4)_4$ |
| Inorganic Solid [1] | Alumina | Si-Al | Si-Al | Alumina | Alumina | Alumina | Si-Al | Si-Al | Si-Al |
| Olefin | Ethylene | Ethylene | Propylene | Propylene | Propylene | Propylene | Propylene | Propylene | Propylene |
| Run time, hours | 3 | 3 | 24 | 2 | 2 | 2 | 2 | 2 | 2 |
| Reaction temp., F | 275 | 275 | 275 | 240 | 240 | 240 | 240 | 240 | 240 |
| Reaction pressure, p.s.i.g | 300 | 300 | 450 | 450 | 450 | 450 | 450 | 450 | 450 |
| Catalyst, grams | 2.4 | 1.01 | 0.64 | 3.44 | 2.0 | 1.92 | 1.94 | 1.97 | 1.90 |
| Transition metal, millimoles | | 0.332 | 0.354 | | | 0.632 | 0.609 | 1.26 | 0.612 |
| Polymer produced, grams | 114 | 41.3 | 14 | 35.4 | 19.3 | 34.4 | 86.06 | 102.7 | 51.3 |
| Yield, g./mole transition metal | 206,000 | 124,000 | 39,000 | 45,000 | 27,000 | 54,000 | 140,000 | 81,000 | 84,000 |
| Viscosity (inherent) | | | 2.24 | 1.22 | | | | | |
| Density, g./cc | 0.9499 | 0.9516 | 0.9182 | 0.9063 | | 0.9069 | | | |

[1] Si-Al designates an inorganic solid of the silica-alumina type.

EXAMPLE IX

*Catalyst J.*—A commercial silica-alumina having a silica to alumina weight ratio of about 88/12 was heated in a stream of air for 5 hours at a temperature of 750° F. 8.89 grams of the activated silica-alumina was added to a solution containing 0.43 gram $Zr(BH_4)_4$ dissolved in 30 milliliters of dry cyclohexane. This mixture was allowed to stand for some time with occasional agitation before the cyclohexane was removed by vacuum flashing. The catalyst thus formed was analyzed and found to contain 2.94 weight percent zirconium based on total weight of reactants.

EXAMPLE X

The catalysts described in Examples I through IX were employed to effect polymerization of ethylene and/or propylene. The results obtained with catalysts prepared in Examples I through IX are compared in Table I with analogous runs made with other transition metal borohydrides which were not reacted with an oxide. The polymerization runs with the catalysts of the invention and the control runs were all made substantially in the same manner.

A 1.4 liter reactor was flushed with dry nitrogen and charged with the candidate catalyst and 300 grams of dry cyclohexane. Except where indicated, the reactor was heated to the desired reaction temperature, about 275° F. for ethylene polymerization, and in the range of 240° to 275° F. for propylene polymerization. The olefin was then introduced so as to reach and maintain the desired reaction pressure. After a 2 to 24 hour reaction, the polymerization reaction was terminated by venting the reactor so as to remove unreacted monomer and distill off the cyclohexane. The solid product was then dried at about 210° F.

The solid polyethylene produced in this manner with

Referring to Table I above, the control runs summarize data for runs with various transition metal borohydride catalysts such as disclosed in my copending application, supra. The remainder of the table summarizes typical data for runs with the various candidate catalysts of the present invention wherein various transition metal borohydrides are reacted with an activated silica and/or alumina inorganic solid. It will be observed from the data that the borohydride catalysts of the invention are highly effective for polymerization of ethylene and propylene. It will be noted in particular that the yield of polymer as expressed in grams per mole of borohydride is considerably higher with the borohydride catalysts of the invention than with the control catalysts. Further, the effectiveness per unit weight of expensive transition metal in the catalyst composition is more than 10 times greater for the catalyst of this invention.

EXAMPLE XI

*Catalyst K.*—A commercial silica-alumina having a silica to alumina ratio of about 88/12 was heated in a stream of dry air for 5 hours at a temperature of 1100° F. 12.01 grams of the activated silica-alumina was added to a flask containing approximately 1 gram of $Zr(BH_4)_4$ and about 50 milliliters of dry cyclohexane. A slight bubbling reaction was noted and the odor of diborane was detected. Cyclohexane was then removed from the mixture by distillation under vacuum. After removal of the cyclohexane, the catalyst was then evacuated at less than 1 mm. Hg pressure for an additional hour at room temperature (70 to 100° F.). There was no $Zr(BH_4)_4$ detected in the trap which was cooled in a Dry Ice bath. The catalyst thus formed is calculated to contain about 4.7 weight percent zirconium based on total weight of reactants.

The reaction product of $Zr(BH_4)_4$ and silica-alumina prepared above was used to polymerize 1,3-butadiene in a manner similar to the polymerization of ethylene and propylene described in Example X. 0.95 gram of the catalyst was charged to reactor containing 300 grams of dry cyclohexane. 210.4 grams of 1,3-butadiene was added to the reactor. The reactor temperature was maintained at about 170° F. and the pressure about 160 p.s.i.g. for the 24 hour reaction period.

A total of 109.7 grams of butadiene polymer was obtained. 101.8 grams of the polymer was in solid particle form and 7.9 grams was tacky.

EXAMPLE XII

This control run illustrates the fact that the inorganic solids, as previously described, are not highly effective for polymerization of olefins under the conditions described for the previous examples. For this run, a commercial cracking catalyst of the silica-alumina type having a silica to alumina weight ratio of 87 to 13 was activated by heating in nitrogen at 1400° F. for one hour and then in hydrogen at 1400° F. for four hours. A 2.2 gram sample of the activated solid was used to effect polymerization of ethylene in a 1400 ml. steel reactor which was flushed with nitrogen and heated to 280° F. After charging the catalyst, cyclohexane in amount of 226 grams was charged. The monomer was then admitted to achieve a pressure of about 300 p.s.i.g. After a reaction period of one hour at 280° F., the recovered polymer amounted to only 0.05 gram per gram of catalyst. Thus, the silica-alumina had little, if any, activity for polymerizing ethylene.

In the foregoing specification, inherent viscosity was determined with a solution containing 0.1000 gram sample of the polymer dissolved in 50 ml. of tetralin. The viscosity of the solution at 130°±0.2° C. is then determined by means of an Ostwald-Fenske viscosimeter.

Density of the polymer as used herein is determined as follows: A 1/16" thick slab is compression molded by heating the polymer between suitable press platens, maintained at a temperature of 325° F. for 5 minutes, and then pressing the polymer at 20,000 p.s.i. Cooling water is then circulated through the platens so as to provide a cooling rate of from 20 to 50° F. per minute. A small "pea-size" specimen is cut from the prepared slab. The density is determined by the height at which the sample is suspended in an ethyl alcohol-water gradient column whose density at all levels is known.

As will be evident to those skilled in the art, many variations and modifications can be practiced within the scope of the disclosure and claims to this invention. The invention resides in a process, a novel catalyst, and a method of preparation thereof, the process comprising polymerizing an olefin of the type described by contacting with a catalyst comprising, as the essential catalytic constituents, a reaction product of a transition metal borohydride or an analogue thereof and a material selected from the group consisting of silica, alumina, and silica-alumina.

I claim:

1. A catalyst active for polymerization consisting essentially of the reaction product of a compound selected from the group consisting of transition metal borohydrides and hydrocarbon and halogen substituted transition metal borohydrides and a solid material selected from the group consisting of silica, alumina and silica-alumina, said solid material having been activated prior to reaction with said compound by heating at an elevated temperature for a period of time sufficient to remove substantially free water present therein.

2. A catalyst active for polymerization consisting essentially of the reaction product of a compound having the structural formula $M(BR_4)_aX_b$ wherein M is a transition metal, R is selected from the group consisting of hydrogen and hydrocarbon radicals, X is a halogen selected from the group consisting of chlorine, bromine and iodine, and the sum of $a$ plus $b$ is equal to the valence of M, and a solid material selected from the group consisting of silica, alumina and silica-alumina, said solid material having been activated prior to reaction with said compound by heating at a temperature in the range 570–1900° F. for a period of time sufficient to remove substantially free water present therein.

3. A catalyst active for polymerization consisting essentially of the reaction product of a compound having the structural formula $M(BR_4)_aX_b$ wherein M is a transition metal selected from the metals of Groups IVB, Group VB, and Group VIB of Deming's periodic table, R is selected from the group hydrogen, X is a halogen selected from the group consisting of chlorine, bromine, and iodine, and the sum of $a$ plus $b$ is equal to the valence of M, and a solid comprising a material selected from the group consisting of slicia, alumina and silica-alumina, said solid material having been activated prior to reaction with said compound by heating at a temperature in the range 800–1500° F. for at least about 5 minutes.

4. A catalyst composition according to claim 3 wherein said compound is $Ti(BH_4)_3$ and said solid material is a slicia-alumina.

5. A catalyst composition according to claim 3 wherein said compound is $Zr(BH_4)_4$ and said solid material is a silica-alumina.

6. A catalyst composition according to claim 3 wherein said compound is $Hf(BH_4)_4$ and said solid material is a silica-alumina.

7. A catalyst composition according to claim 3 wherein said compound is $Ti(BH_4)_2Cl$ and said solid material is a silica-alumina.

8. A catalyst composition according to claim 3 wherein amount of M in said catalyst ranges from 0.1 to about 10 weight percent.

9. A process of preparing a catalyst adapted for the polymerization of polymerizable monomers which comprises activating a solid material selected from the group consisting of silica, alumina and silica-alumina by heating said material at an elevated temperature to remove free water from same, reacting said activated material with a compound having the structural formula $M(BR_4)_aX_b$, wherein M is a transition metal, R is selected from the group consisting of hydrogen and hydrocarbon radicals, X is a halogen selected from the group consisting of chlorine, bromine and iodine, and the sum of $a$ plus $b$ is equal to the valence of M, and recovering said catalyst, active for polymerization, as a product of the process.

10. A process which comprises polymerizing a polymerizable hydrocarbon monomer, having aliphatic unsaturation, as a polymerization temperature up to about 450° F., in the presence of a polymerization catalyst active for such polymerization consisting essentially of the reaction product of a compound selected from the group consisting of transition metal borohydrides and hydrocarbon and halogen substituted transition metal borohydrides, and a solid material selected from the group consisting of silica, alumina, and silica-alumina, said solid material having been activated prior to reaction with said compound by heating at an elevated temperature for a period of time sufficient to remove substantially free water present therein.

11. A process which comprises polymerizing at least one polymerizable olefin, at a polymerization temperature of up to about 450° F., by contacting said olefin in the presence of a catalyst consisting essentially of the reaction product of a compound having the structural formula $M(BR_4)_aX_b$, wherein M is a transition metal, R is selected from the group consisting of hydrogen and hydrocarbon radicals, X is a halogen selected from the group consisting of chlorine, bromine and iodine, and the sum of $a$ plus $b$ is equal to the valence of M, and a solid material selected from the group consisting of silica, alumina and silica-alumina, said solid material having been activated prior to reaction with said compound by heating at a temperature in the range 570–1900° F. for a period of time sufficient to remove substantially free water present therein and recovering polymer.

12. A process which comprises polymerizing at least one aliphatic 1-olefin of 2 to 8 carbon atoms, at a polymerization temperature of up to about 450° F., by polymerizing said olefin in the presence of catalyst consisting essentially of the reaction product of a compound having a structural formula $M(BR_4)_aX_b$, wherein M is a transition metal selected from the metals of Groups IVB, Group VB, and Group VIB of Deming's periodic table, R is hydrogen, X is a halogen selected from the group consisting of chlorine, bromine and iodine, and the sum of $a$ plus $b$ is equal to the valence of M, and a solid comprising a material selected from the group consisting of silica, alumina and silica-alumina, said solid material having been activated prior to reaction with said compound by heating at a temperature in the range 800–1500° F. for at least about 5 minutes and recovering a resulting solid polymer.

13. A process according to claim 12 wherein said compound is $Ti(BH_4)_3$.

14. A process according to claim 12, wherein said compound is $Zr(BH_4)_4$.

15. A process according to claim 12 wherein said compound is $Hf(BH_4)_4$.

16. A process which comprises polymerizing at least one polymerizable aliphatic 1-olefin of 2 to 8 carbon atoms, at a polymerization temperature in the range of 0 to 450° F., by polymerizing said olefin in the presence of a catalyst consisting essentially of the reaction product of compound having a structural formula $M(BR_4)_aX_b$, wherein M is a transition metal selected from the metals of Group IVB, Group VB and Group VIB, of Deming's periodic table, R is selected from the group consisting of hydrogen and hydrocarbon radicals, X is a halogen selected from the group consisting of chlorine, bromine and iodine, and the sum of $a$ plus $b$ is equal to the valence of M, and a solid comprising a material selected from the group consisting of silica, alumina and silica-alumina to form a catalyst having from 0.1 to about 10 weight percent of M, said solid material having been activated prior to reaction with said compound by heating at a temperature in the range 570–1900° F. for a period of time sufficient to remove substantially free water present therein and recovering a resulting solid polymer.

17. A process according to claim 16 wherein said compound is $Ti(BH_4)_3$ and said material is a silica-alumina.

18. A process according to claim 16 wherein said compound is $Zr(BH_4)_4$ and said material is a silica-alumina.

19. A process according to claim 16 wherein said compound is $Hf(BH_4)_4$ and said material is a silica-alumina.

References Cited in the file of this patent

UNITED STATES PATENTS

| | | |
|---|---|---|
| 2,728,758 | Field et al. | Dec. 27, 1955 |
| 2,912,422 | Fotis et al. | Nov. 10, 1959 |
| 2,912,423 | Peters et al. | Nov. 10, 1959 |
| 2,965,628 | Tsutsumi | Dec. 20, 1960 |

FOREIGN PATENTS

| | | |
|---|---|---|
| 801,401 | Great Britain | Sept. 10, 1958 |
| 575,447 | Canada | May 5, 1959 |